US006996201B2

(12) United States Patent  (10) Patent No.: US 6,996,201 B2
Arima  (45) Date of Patent: Feb. 7, 2006

(54) DATA RECEIVING SYSTEM ROBUST AGAINST JITTER OF CLOCK

(75) Inventor: Masaki Arima, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 757 days.

(21) Appl. No.: 09/785,162

(22) Filed: Feb. 20, 2001

(65) Prior Publication Data

US 2001/0017905 A1    Aug. 30, 2001

(30) Foreign Application Priority Data

Feb. 18, 2000    (JP)    ............................... 2000-41794

(51) Int. Cl.
*H04L 7/00*    (2006.01)
(52) U.S. Cl. ...................... 375/355; 375/371; 370/517; 327/144; 327/161
(58) Field of Classification Search ................ 375/354, 375/355, 371; 370/516, 517; 527/141, 144, 527/153, 161
See application file for complete search history.

(56) References Cited

U.S. PATENT DOCUMENTS 5,577,078 A    11/1996    Jordan et al.
5,642,386 A  *  6/1997   Rocco, Jr. .................... 375/355
6,122,335 A     9/2000    Colella et al.
6,266,799 B1 *  7/2001   Lee et al. ........................ 716/6
6,285,722 B1 *  9/2001   Banwell et al. ............. 375/354
6,349,387 B1 *  2/2002   Blomgren et al. .......... 713/501

FOREIGN PATENT DOCUMENTS

EP    0 831 688 A2    3/1988
EP    0 424 741 A2    5/1991

OTHER PUBLICATIONS

European Search Report dated May 26, 2004.

* cited by examiner

*Primary Examiner*—Dac V. Ha
(74) *Attorney, Agent, or Firm*—Connolly Bove Lodge & Hutz LLP (57) ABSTRACT

A plurality of delay circuits successively delay a received data. The received data and delayed data signals are sampled in response to both leading and trailing edges of a clock having a frequency substantially identical with that of a data transmission rate of the received data. When a sampling value having the same value V (V=1 or 0) appears continuously N times in the sampling operation of the received data 101 (where N is an even number), it is judged that a data of value V is continuously received (N/2) times.

10 Claims, 10 Drawing Sheets

DATA RECEIVING SYSTEM ROBUST AGAINST JITTER OF CLOCK

BACKGROUND OF THE INVENTION

This invention relates to a data receiving system which is preferable to receive transmitted digital data for communications purpose and for data transmission between LSI circuits.

Figure 9:
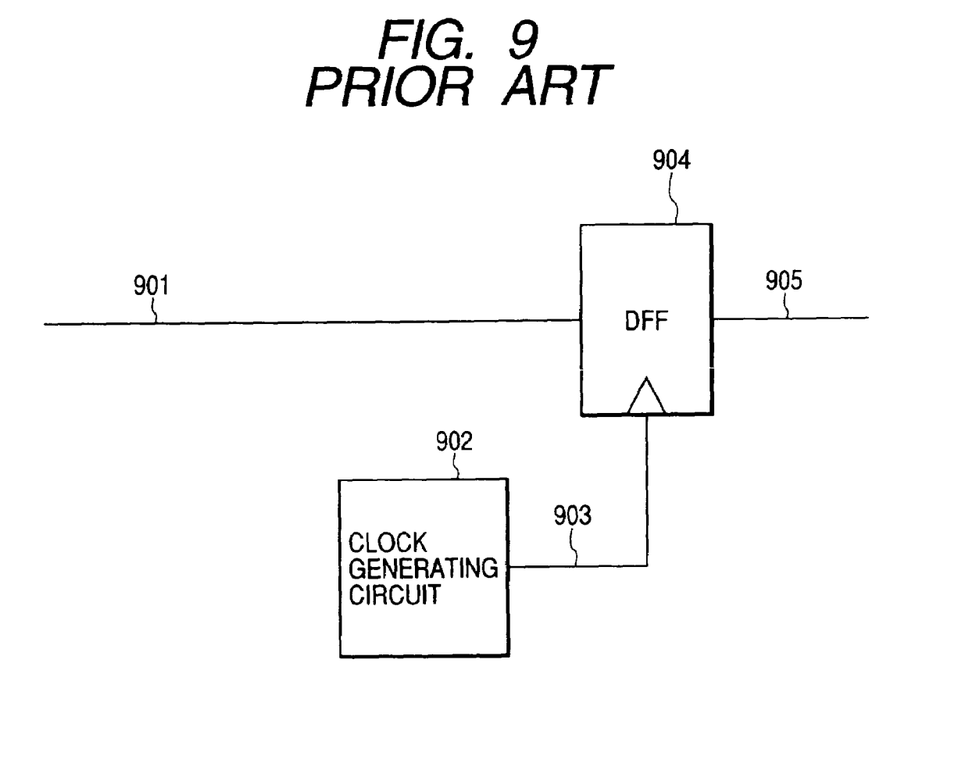
FIG. 9 is a functional block diagram showing a conventional data receiving system.

FIG. 9 shows a conventional data receiving system, according to which a received data 901 is entered into a D flip-flop (i.e., DFF) circuit 904 via a data input terminal thereof. A clock generating circuit 902 generates a clock signal 903 in synchronism with a data transmission rate of the received data 901. The clock signal 903 is entered into the DFF circuit 904 via a clock terminal thereof. The DFF circuit 904 samples the received data 901 in response to each leading edge of the clock signal 903 and generates an output signal 905 as a sampling result.

Figure 10A:
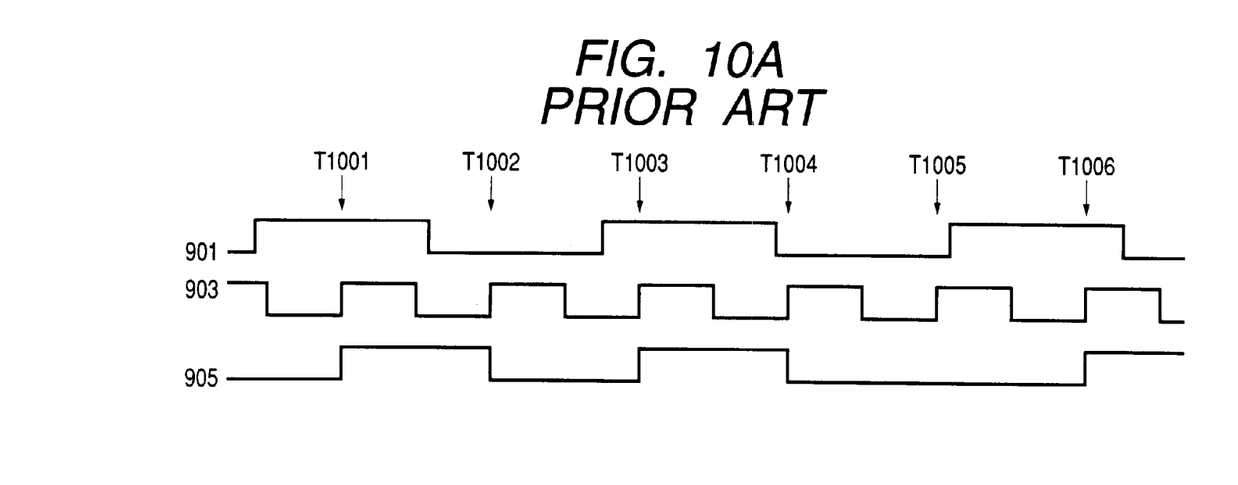
FIGS. 10A and 10B are timing charts showing the relationship of signals relating to the conventional data receiving system.
Figure 10B:
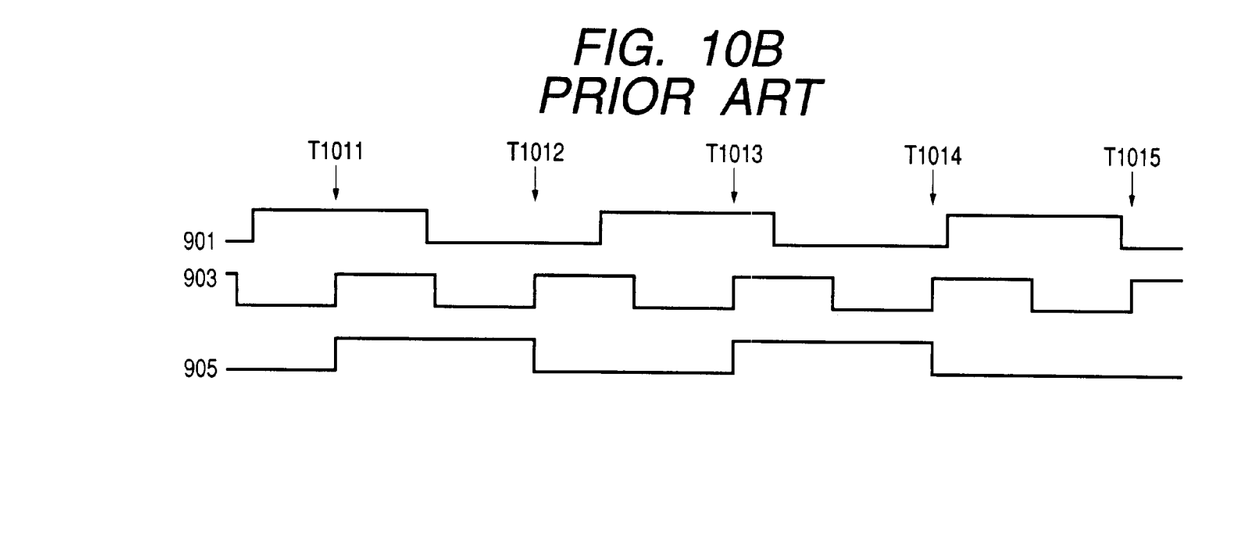

FIGS. 10A and 10B are timing charts showing the relationship among the received data 901, the clock signal 903, and the sampling result 905. In a case shown FIG. 10A, the received data 901 has a higher frequency relative to the data transmission rate of the received data 901. In the other case shown FIG. 10B, the received data 901 has a lower frequency relative to the data transmission rate of the received data 901. The received data 901 is a binary data, e.g., 0101010, whose value alternately changes between 0 and 1. T1001, T1002, T1003, T1004, T1005, T1006, T1011, T1012, T1013, T1014, and T1015 represent leading edge positions of the clock signal 903. In other words, these positions represent sampling times for the received data 901.

An operation of the above-described conventional data receiving system will be explained hereinafter. The frequency of the clock signal 903 is basically identical with that of the data transmission rate of the received data 901. However, the clock generating circuit 902 has jittered frequency characteristics. Accordingly, even if their frequencies can be regarded as identical with each other as a long-term average, their frequencies possibly cause local differences when observed in a short time duration. Such local frequency differences cause phase shifting of the sampling positions with respect to the received data 901. For example, when the frequency of the clock signal 903 is high, the sampling positions gradually shift to the left with elapsed time from the center of the received data 901 which is set at the time T1001 as shown in FIG. 10A. Only one sampling is performed for each data before the sampling time T1003. A correct sampling value is obtained from the output signal 905. However, the same data is sampled twice at successive sampling times T1004 and T1005. In this case, the output signal 905 generates the value 0 twice successively.

On the other hand, when the frequency of the clock signal 903 is low, the sampling positions gradually shift to the right with elapsed time from the center of the received data 901 which is set at the time T1011 as shown in FIG. 10B. Only one sampling is performed for each data before the sampling time T1014. A correct sampling value is obtained from the output signal 905. However, no sampling is performed for the data next to the one sampled at the sampling time T1014. Thus, the output signal 905 generates the sampling value missing the value 1 which was not sampled at the sampling time T1015.

As described above, the receiving circuit having jittered characteristics is subjected to either missing of data or double fetch of data. To solve this problem, it is necessary to use a low jitter and accurate clock.

However, according to the above-described conventional data receiving system which necessitates the use of a low jitter and accurate clock, the cost will increase.

SUMMARY OF THE INVENTION

In view of the foregoing problems, the present invention has an object to provide a data receiving system capable of eliminating errors in data reception based on a low cost circuit without using a low jittered clock.

To accomplish the above and other related objects, the present invention provides a first data receiving system comprising a clock generating circuit for generating a clock whose frequency is synchronous with a frequency of a data transmission rate of a received data, a delay circuit for delaying the received data to generate a delayed data, a first sampling circuit for sampling the received data in response to at least one of leading and trailing edges of the clock and outputting a received data sampling value, a second sampling circuit for sampling the delayed data in response to at least one of leading and trailing edges of the clock and outputting a delayed data sampling value, and received data judging means for judging a received data value based on the received data sampling value and the delayed data sampling value. The received data judging means comprises first judging means for judging the received data value primarily based on either one of the received data sampling value and the delayed data sampling value, and second judging means for judging the received data value secondarily based on the other of the received data sampling value and the delayed data sampling value when the first judging means fails to judge the received data value.

According to the first data receiving system, it is preferable that the clock generating circuit is for generating a clock whose frequency is substantially identical with the frequency of the data transmission rate of the received data. The first sampling circuit is for sampling the received data in response to both of leading and trailing edges of the clock and outputting received data sampling values. And, the second sampling circuit is for sampling the delayed data in response to both of leading and trailing edges of the clock and outputting delayed data sampling value.

Furthermore, according to the first data receiving system, it is preferable that the clock generating circuit is for generating a clock whose frequency is approximately two times the frequency of the data transmission rate of the received data. The first sampling circuit is for sampling the received data in response to one of leading and trailing edges of the clock and outputting the received data sampling value. And, the second sampling circuit is for sampling the delayed data in response to one of leading and trailing edges of the clock and outputting delayed data sampling value.

The present invention provides a second data receiving system comprising a clock generating circuit for generating a clock whose frequency is synchronous with a frequency of a data transmission rate of a received data, a delay circuit for delaying the clock to generate a delayed clock, a first sampling circuit for sampling the received data in response to at least one of leading and trailing edges of the clock and outputting a received data sampling value, a second sampling circuit for sampling the received data in response to at least one of leading and trailing edges of the delayed clock and outputting a delayed data sampling value, and received data judging means for judging a received data value based on the received data sampling value and the delayed data sampling value. The received data judging means comprises first judging means for judging the received data value primarily based on either one of the received data sampling value and the delayed data sampling value, and second judging means for judging the received data value secondarily based on the other of the received data sampling value and the delayed data sampling value when the first judging means fails to judge the received data value.

According to the second data receiving system, it is preferable that the clock generating circuit is for generating a clock whose frequency is substantially identical with the frequency of the data transmission rate of the received data. The first sampling circuit is for sampling the received data in response to both of leading and trailing edges of the clock and outputting received data sampling values. And, the second sampling circuit is for sampling the received data in response to both of leading and trailing edges of the delayed clock and outputting delayed data sampling value.

Furthermore, according to the second data receiving system, it is preferable that the clock generating circuit is for generating a clock whose frequency is approximately two times the frequency of the data transmission rate of the received data. The first sampling circuit is for sampling the received data in response to one of leading and trailing edges of the clock and outputting the received data sampling value. And, the second sampling circuit is for sampling the received data in response to one of leading and trailing edges of the delayed clock and outputting delayed data sampling value.

With the arrangement of the present invention, it becomes possible to eliminate the errors such as missing of data or double fetch of data caused by jitter of the clock. Therefore, it becomes possible to perform the data reception without error.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF PREFERRED EMBODIMENTS

Hereinafter, preferred embodiments of the present invention will be explained with reference to FIGS. 1 to 8C.

First Embodiment

A data receiving system, according to a first embodiment of the present invention, delays a received data to generate a delayed data, samples the received data and the delayed data in response to both edges of a clock having a frequency substantially identical with that of a data transmission rate, and judges a received data value based on a sampling value of the delayed data when the received data value cannot be judged based on a sampling value of the received data.

Figure 1:
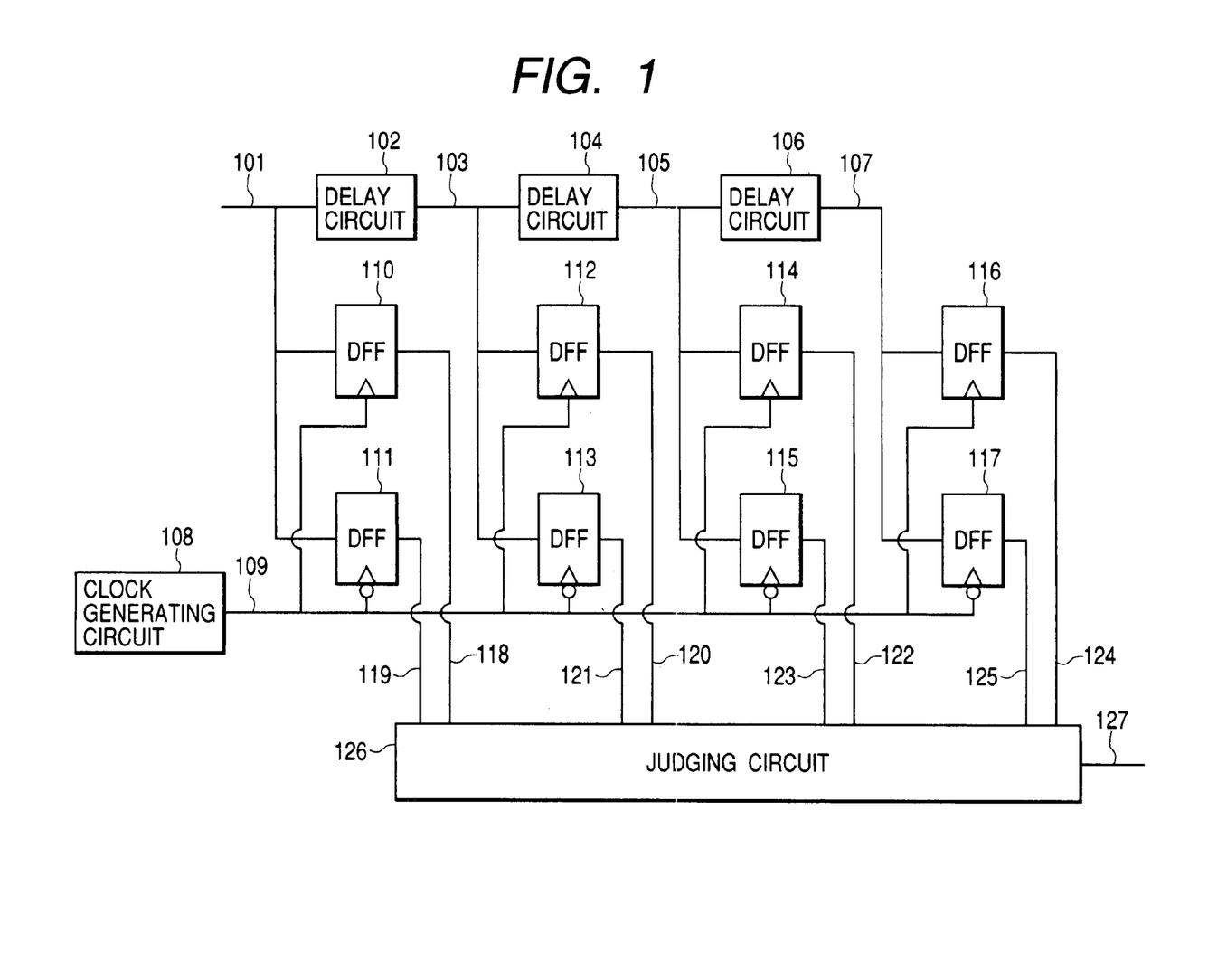
FIG. 1 is a functional block diagram showing a data receiving system in accordance with a first embodiment of the present invention.

FIG. 1 is a functional block diagram showing a data receiving system in accordance with the first embodiment of the present invention. In FIG. 1, a received data signal 101 carries digital data which is generally used for communications purpose and for data transmission between large scale integrated circuits (hereinafter, referred to as LSI circuits). A first delay circuit 102 delays the received data signal 101 by a predetermined time and generates a first delayed data signal 103. A second delay circuit 104 delays the first delayed data signal 103 by a predetermined time and generates a second delayed data signal 105. A third delay circuit 106 delays the second delayed data signal 105 by a predetermined time and generates a third delayed data signal 107. A clock generating circuit 108 generates a clock signal 109 whose frequency is substantially identical with that of a data transmission rate of the received data signal 101.

A first DFF (i.e., D flip-flop) circuit 110 fetches the received data signal 101 in response to the leading edge of the clock signal 109 and generates a first sampling value 118. A second DFF circuit 112 fetches the first delayed data signal 103 in response to the leading edge of the clock signal 109 and generates a third sampling value 122. A third DFF circuit 114 fetches the second delayed data signal 105 in response to the leading edge of the clock signal 109 and generates a third sampling value 122. A fourth DFF circuit 116 fetches the third delayed data signal 107 in response to the leading edge of the clock signal 109 and generates a fourth sampling value 124.

A fifth DFF circuit 111 fetches the received data signal 101 in response to a trailing edge of the clock signal 109 and generates a fifth sampling value 119. A sixth DFF circuit 113 fetches the first delayed data signal 103 in response to the trailing edge of the clock signal 109 and generates a sixth sampling value 121. A seventh DFF circuit 115 fetches the second delayed data signal 105 in response to the trailing edge of the clock signal 109 and generates a seventh sampling value 123. An eighth DFF circuit 117 fetches the third delayed data signal 107 in response to the trailing edge of the clock signal 109 and generates an eighth sampling value 125.

A judging circuit 126 receives the first to eighth sampling values 118 to 125 and judges a received data value based on these sampling values.

Figure 5A:
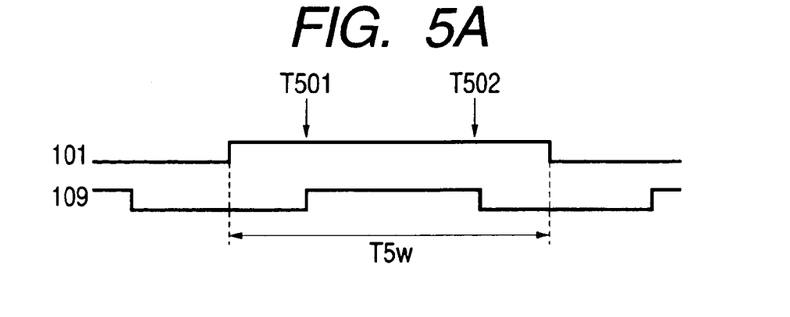
FIGS. 5A to 5C are timing charts showing the relationship of signals relating to the data receiving system in accordance with the first embodiment of the present invention.
Figure 5B:
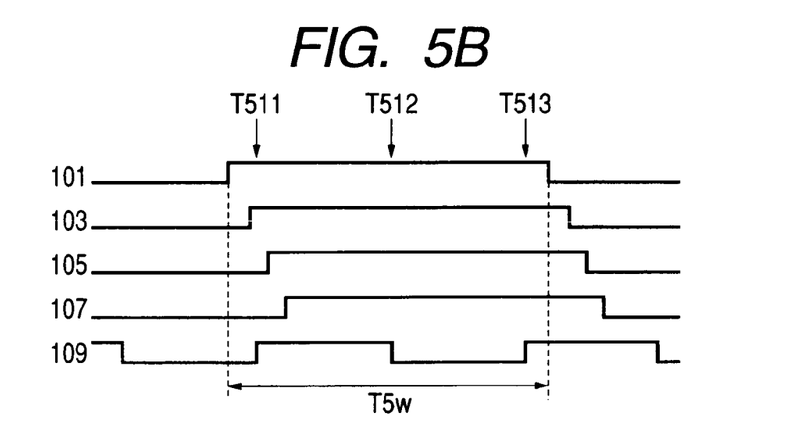
Figure 5C:
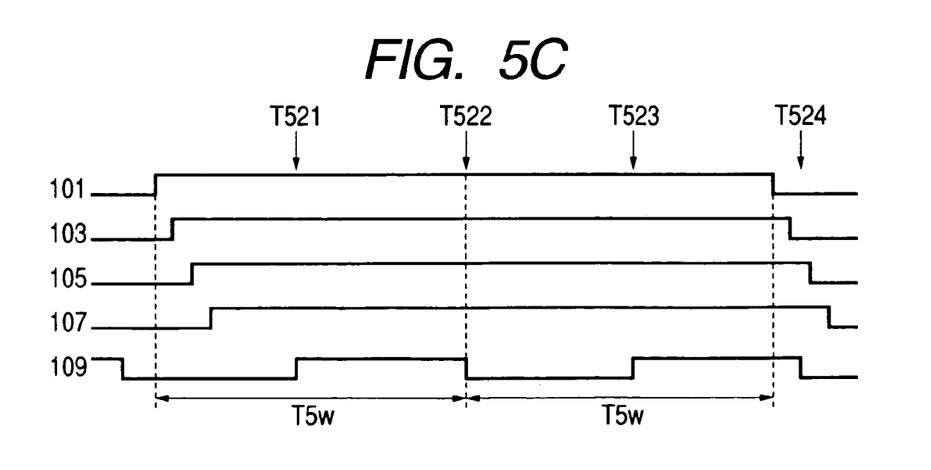

FIGS. 5A, 5B and 5C are timing charts showing the relationship among the received data signal 101, the delayed data signals 103, 105, and 107, and the clock signal 109. T501, T511, T513, T521, and T523 show leading edge positions of the clock signal 109. T502, T512, T522, and T524 show trailing edge positions of the clock signal 109. In other words, these positions represent sampling times for the received data signal 101 or its delayed data signals. T5w represents a time width of one data.

In a case shown FIG. 5A, the sampling times are sufficiently spaced from the edges of the received data signal 101. A time duration having the data value=1 is equal to the length of one data. In a case shown FIG. 5B, some of the sampling times is located near the edges of the received data signal 101. The frequency of the clock signal 109 is slightly higher than that of the data transmission rate of the received data signal 101. A time duration having the data value=1 is equal to the length of one data. In a case shown FIG. 5C, some of the sampling times is located near the edges of the received data signal 101. The frequency of the clock signal 109 is slightly lower than that of the data transmission rate of the received data signal 101. A time duration having the data value=1 is twice the length of one data.

The above-described data receiving system, serving as the first embodiment of the present invention, operates in the following manner. In the timing chart of FIG. 5A, there are two sampling points of T501 and T502 during a time interval equivalent to one data length of the received data signal 101. In this case, the judging circuit 126 makes a judgement that the received data value is 1 when both of the sampling values are 1 and 0 when both of the sampling values are 0.

However, in the timing chart of FIG. 5B, there are three sampling points of T511, T512, and T513 during a time interval equivalent to one data length of the received data signal 101. In the timing chart of FIG. 5C, there are three sampling points of T521, T522, and T523 during a time interval equivalent to twice the one data length of the received data signal 101. When there are three sampling points, obtaining only the sampling point information is insufficient to correctly judge whether the received data is one data or two. Hence, the data receiving system of the first embodiment performs sampling operations simultaneously for all of the received data signal 101, the delayed data signal 103 which is delayed with respect to the received data signal 101, the delayed data signal 105 which is delayed with respect to the delayed data signal 103, and the delayed data signal 107 which is delayed with respect to the delayed data signal 105.

According to this simultaneous sampling operation, in the case shown in FIG. 5B, three sampling points exist for the delayed data signal 103 while two sampling points exist for each of the delayed data signals 105 and 107. In the case shown in FIG. 5C, three sampling points exist for the delayed data signal 103 while four sampling points exist for each of the delayed data signals 105 and 107. When there are an even number of sampling points, this value is utilized to judge the number of received data. More specifically, the judging circuit 126 judges that the received data is one data in the case of FIG. 5B and is two data in the case of FIG. 5C.

In general, when the sampling value of 1 (or 0) appears N times continuously in the sampling operation of the received signal 101 (where N is an even number), it is judged that the data of 1 (or 0) is continuously received (N/2) times. When N is an odd number, an even sampling number is extracted from the sampling numbers corresponding to the delayed receiving data. When the extracted one is expressed by (N−1), it is judged that the data of 1(or 0) is continuously received ((N−1)/2) times. When the extracted one is (N+1), it is judged that the data of 1(or 0) is continuously received ((N+1)/2) times.

The above-described first embodiment is based on the clock generating circuit 108 which generates the clock having substantially the same frequency as that of data transmission rate of the received data signal 101. The present invention can be applied to a clock generating circuit which generates a clock having a frequency synchronous with the data transmission rate of the received data signal 101 wherein the received data and the clock signal cause deviation in their phase relationship.

Furthermore, the above-described first embodiment judges the received data value based on the sampling result of the received data signal 101. And, only when the judgement is failed, the sampling result of the delayed data is used to judge the received data value. Alternatively, it is possible to judge the received data value based on the sampling result of the delayed data signal 107 and rely on other sampling result only when the judgement is failed. In this case other sampling result includes the sampling result of the received data. Furthermore, the total step number of the delay circuits can be flexibly changed to an adequate value from the disclosed three steps in accordance with accuracy of the clock generating circuit or in accordance with a delay amount of each step of the delay circuits.

As described above, the first embodiment of the present invention provides the data receiving system which delays the received data to generate the delayed data, samples the received data and the delayed data in response to both edges of the clock having the frequency substantially identical with that of the data transmission rate, and judges the received data value based on the sampling value of the delayed data when the received data value cannot be judged based on the sampling value of the received data. Therefore, even when the received data is unreadable due to the jitter of clock, the first embodiment of the present invention makes it possible to correctly judge the received data value based on the result of judgement relying on the delayed data.

Second Embodiment

A data receiving system, according to a second embodiment of the present invention, delays a received data to generate a delayed data, samples the received data and the delayed data in response to a leading edge of a clock whose frequency is approximately two times a frequency of a data transmission rate, and judges a received data value based on a sampling value of the delayed data when the received data value cannot be judged based on a sampling value of the received data.

Figure 2:
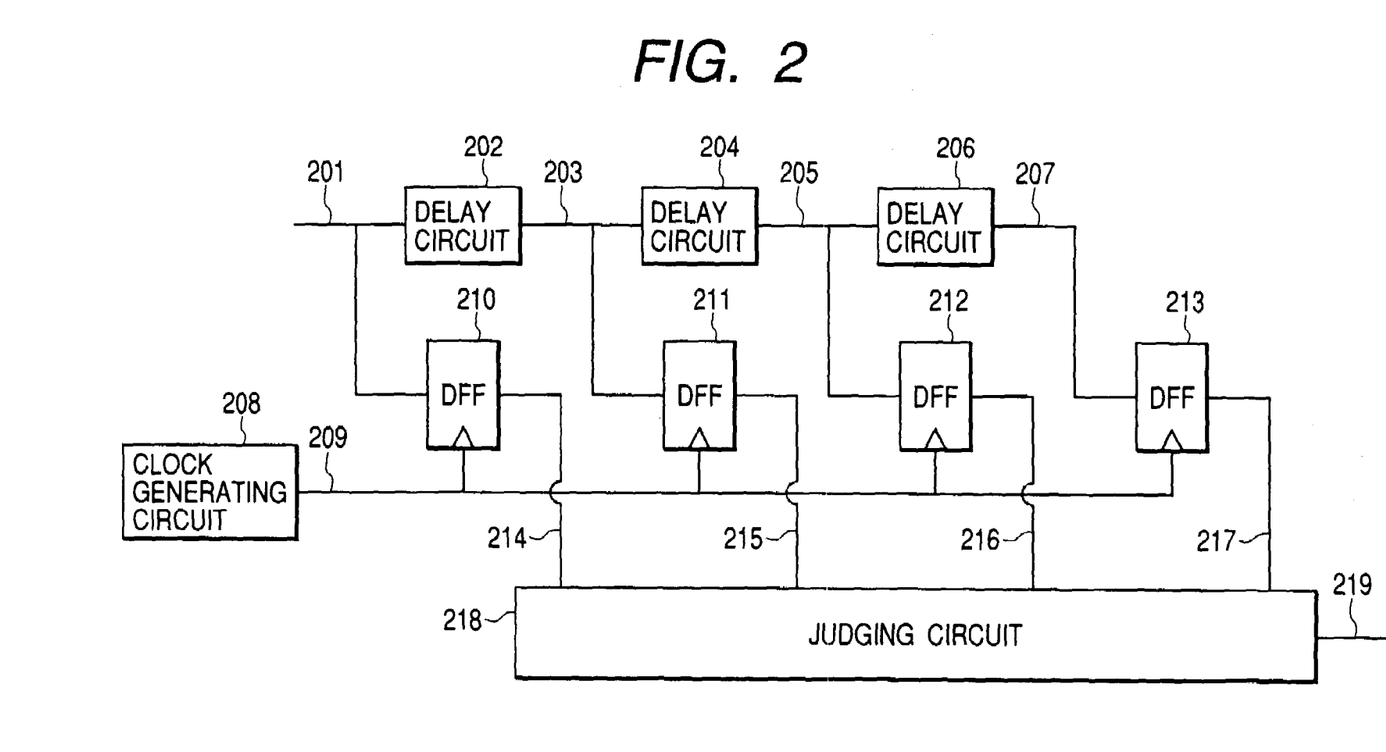
FIG. 2 is a functional block diagram showing a data receiving system in accordance with a second embodiment of the present invention.

FIG. 2 is a functional block diagram showing a data receiving system in accordance with the second embodiment of the present invention. In FIG. 2, a received data signal 201 carries digital data which is generally used for communications purpose and for data transmission between LSI circuits. A first delay circuit 202 delays the received data signal 201 by a predetermined time and generates a first delayed data signal 203. A second delay circuit 204 delays the first delayed data signal 203 by a predetermined time and generates a second delayed data signal 205. A third delay circuit 206 delays the second delayed data signal 205 by a predetermined time and generates a third delayed data signal 207. A clock generating circuit 208 generates a clock signal 209 whose frequency is substantially two times a frequency of a data transmission rate of the received data signal 201.

A first DFF circuit 210 fetches the received data signal 201 in response to a leading edge of the clock signal 209 and generates a first sampling value 214. A second DFF circuit 211 fetches the first delayed data signal 203 in response to the leading edge of the clock signal 209 and generates a second sampling value 215. A third DFF circuit 212 fetches the second delayed data signal 205 in response to the leading edge of the clock signal 209 and generates a third sampling value 216. A fourth DFF circuit 213 fetches the third delayed data signal 207 in response to the leading edge of the clock signal 209 and generates a fourth sampling value 217.

A judging circuit 218 receives the first to fourth sampling values 214 to 217 and judges a received data value based on these sampling values.

Figure 6A:
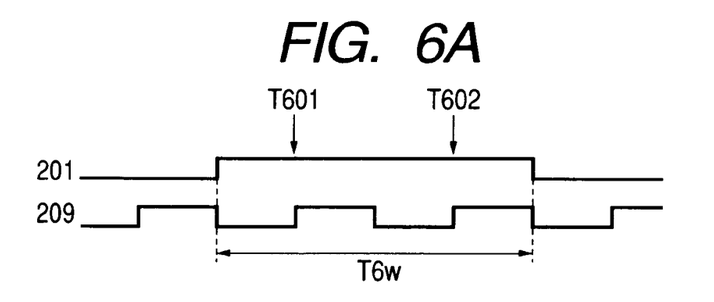
FIGS. 6A to 6C are timing charts showing the relationship of signals relating to the data receiving system in accordance with the second embodiment of the present invention.
Figure 6B:
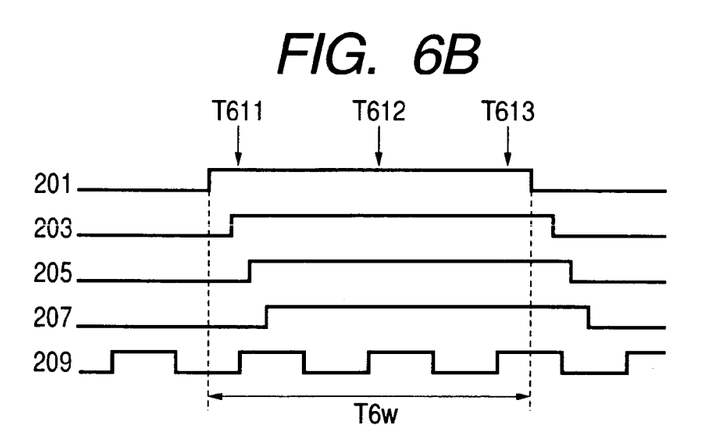
Figure 6C:
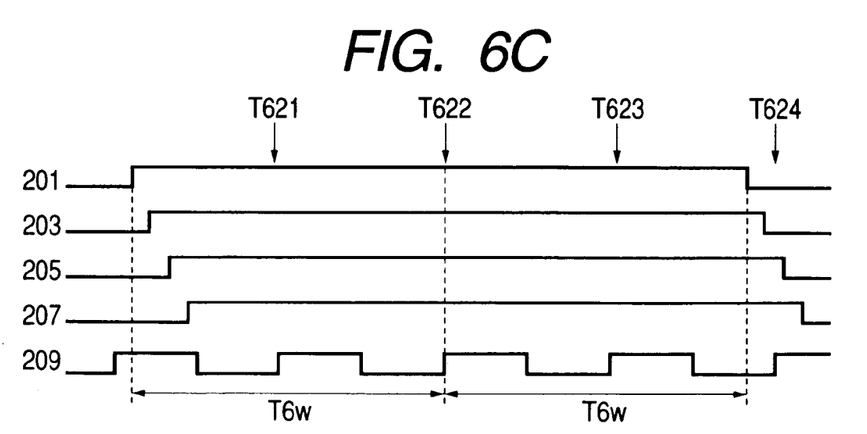

FIGS. 6A, 6B and 6C are timing charts showing the relationship among the received data signal 201, delayed data signals 203, 205, and 207, and the clock signal 209. T601, T602, T611, T612, T613, T621, T622, T623, and T624 show leading edge positions of the clock signal 209. In other words, these positions represent sampling times for the received data signal 201 or its delayed data signals. T6w represents a time width of one data.

In a case shown FIG. 6A, the sampling times are sufficiently spaced from the edges of the received data signal 201. A time duration having the data value=1 is equal to the length of one data. In a case shown FIG. 6B, some of the sampling times is located near the edges of the received data signal 201. The frequency of the clock signal 209 is slightly higher than two times the frequency of the data transmission rate of the received data signal 201. A time duration having the data value=1 is equal to the length of one data. In a case shown FIG. 6C, some of the sampling times is located near the edges of the received data signal 201. The frequency of the clock signal 209 is slightly lower than two times the frequency of the data transmission rate of the received data signal 201. A time duration having the data value=1 is twice the length of one data.

The above-described data receiving system, serving as the second embodiment of the present invention, operates in the following manner. In the timing chart of FIG. 6A, there are two sampling points of T601 and T602 during a time interval of the received data signal 201 corresponding to data value=1. In this case, the judging circuit 218 makes a judgement that the received data value (corresponding to one data) is 1 as both of the sampling values are 1. However, in the timing chart of FIG. 6B, there are three sampling points of T611, T612, and T613 during a time interval of the received data signal 201 corresponding to data value=1. In the timing chart of FIG. 6C, there are three sampling points of T621, T622, and T623 during a time interval of the received data signal 301 corresponding to data value=1. When there are three sampling points, obtaining only the sampling point information is insufficient to correctly judge whether the received data is one data or two.

Hence, the data receiving system of the second embodiment performs sampling operations simultaneously for all of the received data signal 201, the delayed data signal 203 which is delayed with respect to the received data signal 201, the delayed data signal 205 which is delayed with respect to the delayed data signal 203, and the delayed data signal 207 which is delayed with respect to the delayed data signal 205.

According to this simultaneous sampling operation, in the case shown in FIG. 6B, three sampling points exist for the delayed data signal 203 while two sampling points exist for each of the delayed data signals 205 and 207. In the case shown in FIG. 6C, three sampling points exist for the delayed data signal 203 while four sampling points exist for each of the delayed data signals 205 and 207. When there are an even number of sampling points, this value is utilized to judge the number of received data. More specifically, the judging circuit 218 judges that the received data is one data in the case of FIG. 6B and is two data in the case of FIG. 6C.

In general, when the sampling value of 1 (or 0) appears N times continuously in the sampling operation of the received data signal 201 (where N is an even number), it is judged that the data of 1 (or 0) is continuously received (N/2) times. When N is an odd number, an even sampling number is extracted from the sampling numbers corresponding to the delayed receiving data. When the extracted one is expressed by (N−1), it is judged that the data of 1(or 0) is continuously received ((N−1)/2) times. When the extracted one is (N+1), it is judged that the data of 1(or 0) is continuously received ((N+1)/2) times.

Although the sampling operation is performed based on the leading edge, the second embodiment can be modified so as to perform the sampling operation based on a trailing edge. Furthermore, the above-described second embodiment judges the received data value based on the sampling result of the received data signal 201. And, only when the judgement is failed, the sampling result of the delayed data is used to judge the received data value. Alternatively, it is possible to judge the received data value based on the sampling result of the delayed data signal 207 and rely on other sampling result only when the judgement is failed. Furthermore, the total step number of the delay circuits can be flexibly changed.

As described above, the second embodiment of the present invention provides the data receiving system which delays the received data to generate the delayed data, samples the received data and the delayed data in response to the leading edge of the clock whose frequency is approximately two times the frequency of the data transmission rate, and judges the received data value based on the sampling value of the delayed data when the received data value cannot be judged based on the sampling value of the received data. Therefore, even when the received data is unreadable due to the jitter of clock, the second embodiment of the present invention makes it possible to correctly judge the received data value based on the result of judgement relying on the delayed data.

Third Embodiment

A data receiving system, according to a third embodiment of the present invention, generates a clock having a frequency substantially identical with that of a data transmission rate, samples a received data in response to both edges of each of the clock and a delayed clock, and judges a received data value based on a sampling result of the received data responsive to the delayed clock when the received data value cannot be judged based on a sampling value of the received data responsive to the clock.

Figure 3:
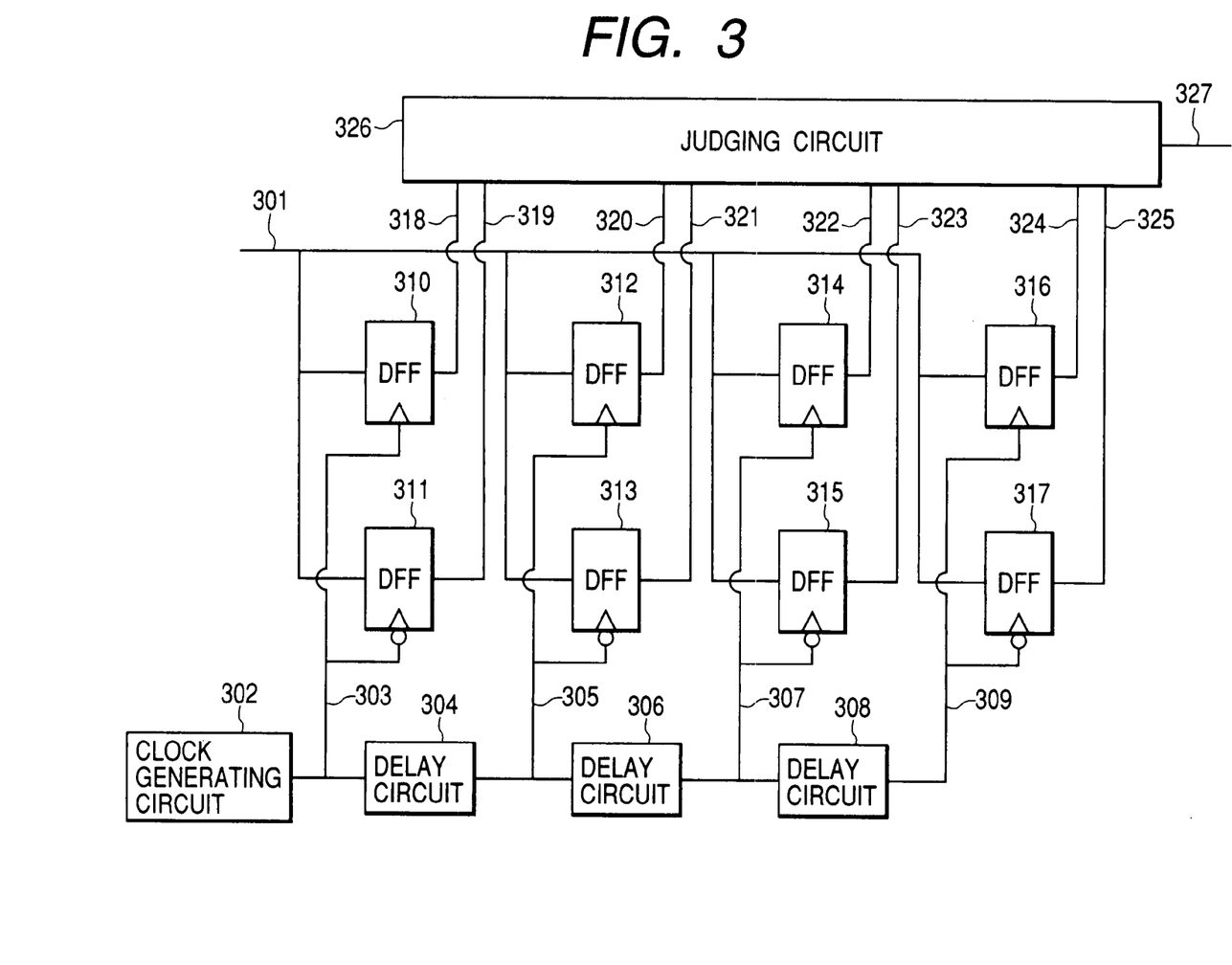
FIG. 3 is a functional block diagram showing a data receiving system in accordance with a third embodiment of the present invention.

FIG. 3 is a functional block diagram showing a data receiving system in accordance with the third embodiment of the present invention. In FIG. 3, a received data signal 301 carries digital data which is generally used for communications purpose and for data transmission between LSI circuits. A clock generating circuit 302 generates a clock signal 303 having a frequency substantially identical with that of a data transmission rate of the received data signal 301.

A first delay circuit 304 delays the clock signal 303 by a predetermined time and generates a first delayed clock signal 305. A second delay circuit 306 delays the first delayed clock signal 305 by a predetermined time and generates a second delayed clock signal 307. A third delay circuit 308 delays the second delayed clock signal 307 by a predetermined time and generates a third delayed clock signal 309.

A first DFF circuit 310 fetches the received data signal 301 in response to a leading edge of the clock signal 303 and generates a first sampling value 318. A second DFF circuit 312 fetches the received data signal 301 in response to a leading edge of the first delayed clock signal 305 and generates a second sampling value 320. A third DFF circuit 314 fetches the received data signal 301 in response to a leading edge of the second delayed clock signal 307 and generates a third sampling value 322. A fourth DFF circuit 316 fetches the received data signal 301 in response to a leading edge of the third delayed clock signal 309 and generates a fourth sampling value 324.

A fifth DFF circuit 311 fetches the received data signal 301 in response to a trailing edge of the clock signal 303 and generates a fifth sampling value 319. A sixth DFF circuit 313 fetches the received data signal 301 in response to a trailing edge of the first delayed clock signal 305 and generates a sixth sampling value 321. A seventh DFF circuit 315 fetches the received data signal 301 in response to a trailing edge of the second delayed clock signal 307 and generates a seventh sampling value 323. An eighth DFF circuit 317 fetches the received data signal 301 in response to a trailing edge of the third delayed clock signal 309 and generates an eighth sampling value 325.

A judging circuit 326 receives the first to eighth sampling values 318 to 325 and judges a received data value based on these sampling values.

Figure 7A:
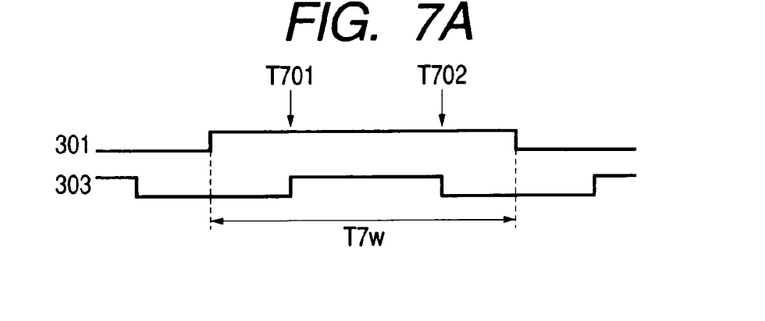
FIGS. 7A to 7C are timing charts showing the relationship of signals relating to the data receiving system in accordance with the third embodiment of the present invention.
Figure 7B:
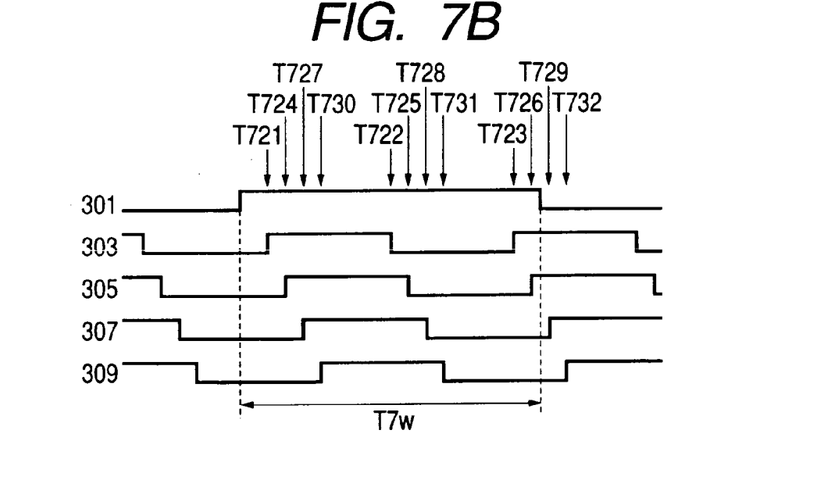
Figure 7C:
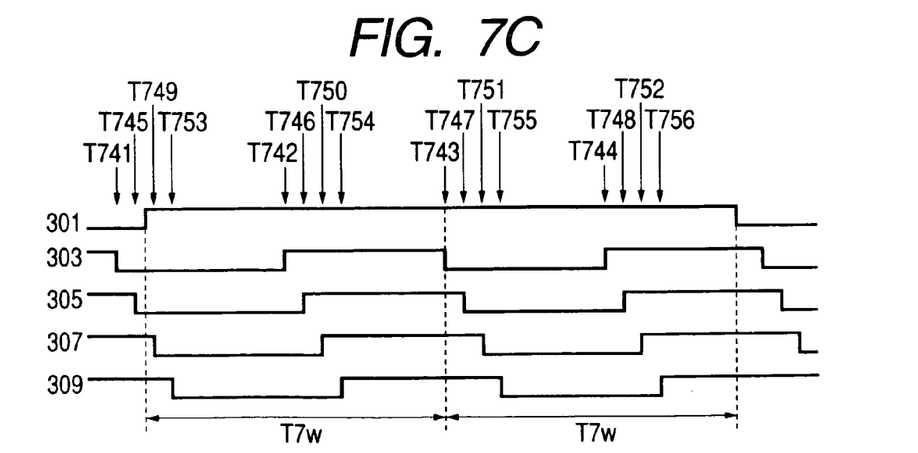

FIGS. 7A, 7B and 7C are timing charts showing the relationship among the received data signal 301, the clock signal 303 and delayed clock signals 305, 307, and 309. Times T701, T721, T723, T742, and T744 show leading edge positions of the clock signal 303. Times T702, T722, T741, and T743 show trailing edge positions of the clock signal 303. Times T724, T726, T746, and T748 show leading edge positions of the delayed clock signal 305. Times T725, T745, and T747 show trailing edge positions of the delayed clock signal 305. Times T727, T729, T750, and T752 show leading edge positions of the delayed clock signal 307. Times T728, T749, and T751 show trailing edge positions of the delayed clock signal 307. Times T730, T732, T754, and T756 show leading edge positions of the delayed clock signal 309. Times T731, T753, and T755 show trailing edge positions of the delayed clock signal 307. In other words, these positions represent sampling times for the received data signal 301. T7w represents a time width of one data.

In a case shown FIG. 7A, the sampling times responsive to the clock signal 303 are sufficiently spaced from the edges of the received data signal 301. A time duration having the data value=1 is equal to the length of one data. In a case shown FIG. 7B, some of the sampling times responsive to the clock signal 303 is located near the edges of the received data signal 301. The frequency of the clock signal 303 is slightly higher than that of the data transmission rate of the received data signal 301. A time duration having the data value=1 is equal to the length of one data. In a case shown FIG. 7C, some of the sampling times responsive to the clock signal 303 is located near the edges of the received data signal 301. The frequency of the clock signal 303 is slightly lower than that of the data transmission rate of the received data signal 301. A time duration having the data value=1 is twice the length of one data.

The above-described data receiving system, serving as the third embodiment of the present invention, operates in the following manner. In the timing chart of FIG. 7A, there are two sampling points of T701 and T702 during a time interval equivalent to one data length of the received data signal 301 (corresponding to data value=1). In this case, the judging circuit 326 makes a judgement that the received data value is 1 as both of the sampling values are 1. However, in the timing chart of FIG. 7B, there are three sampling points of T721, T722, and T723 during a time interval of the received data signal 301 corresponding to data value=1. In the timing chart of FIG. 7C, there are three sampling points of T742, T743, and T744 during a time interval of the received data signal 301 corresponding to data value=1. When there are three sampling points, obtaining only the sampling point information is insufficient to correctly judge whether the received data is one data or two.

Hence, the data receiving system of the third embodiment successively samples the received data signal 301 in response to both leading and trailing edges of all of the delayed clock signal 305 which is delayed with respect to the clock signal 303, the delayed clock signal 307 which is delayed with respect to the delayed clock signal 305, and the delayed clock signal 309 which is delayed with respect to the delayed clock signal 307. According to this successive sampling operation, in the case shown in FIG. 7B, three sampling points exist for the delayed clock signal 305 while two sampling points exist for each of the delayed clock signals 307 and 309. In the case shown in FIG. 7C, three sampling points exist for the delayed clock signal 305 while four sampling points exist for each of the delayed clock signals 307 an 309. When there are an even number of sampling points, this value is utilized to judge the number of received data. More specifically, the judging circuit 326 judges that the received data is one data in the case of FIG. 7B and is two data in the case of FIG. 7C.

In general, when the sampling value of 1 (or 0) appears N times continuously in the sampling operation of the received signal 301 based on the clock signal 303 (where N is an even number), it is judged that the data of 1 (or 0) is continuously received (N/2) times. When N is an odd number, an even sampling number is extracted from the sampling numbers corresponding to the delayed clock signals of the clock signal 303. When the extracted one is expressed by (N−1), it is judged that the data of 1(or 0) is continuously received ((N−1)/2) times. When the extracted one is (N+1), it is judged that the data of 1(or 0) is continuously received ((N+1)/2) times.

Furthermore, the above-described third embodiment judges the received data value based on the sampling result of the received data signal 301 responsive to the clock signal 303. And, only when the judgement is failed, the sampling result based on the delayed clock signals is utilized to judge the received data value. Alternatively, it is possible to judge the received data value based on the sampling result of the received data signal 301 responsive to the delayed clock signal 307 and rely on other sampling result only when the judgement is failed. Furthermore, the total step number of the delay circuits can be flexibly changed.

As described above, the third embodiment of the present invention provides the data receiving system which generates the clock having the frequency substantially identical with that of the data transmission rate, samples the received data in response to both edges of each of the clock and the delayed clock, and judges the received data value based on the sampling result of the received data responsive to the delayed clock when the received data value cannot be judged based on the sampling value of the received data responsive to the clock. Therefore, even when the received data is unreadable due to the jitter of clock, the third embodiment of the present invention makes it possible to correctly judge the received data value based on the result of judgement relying on the delayed clock.

Fourth Embodiment

A data receiving system, according to a fourth embodiment of the present invention, generates a clock whose frequency is approximately two times a frequency of a data transmission rate, samples a received data in response to a leading edge of each of the clock and its delayed clock, and judges a received data value based on a sampling result of the received data responsive to the delayed clock when the received data value cannot be judged based on a sampling result of the received data responsive to the clock.

Figure 4:
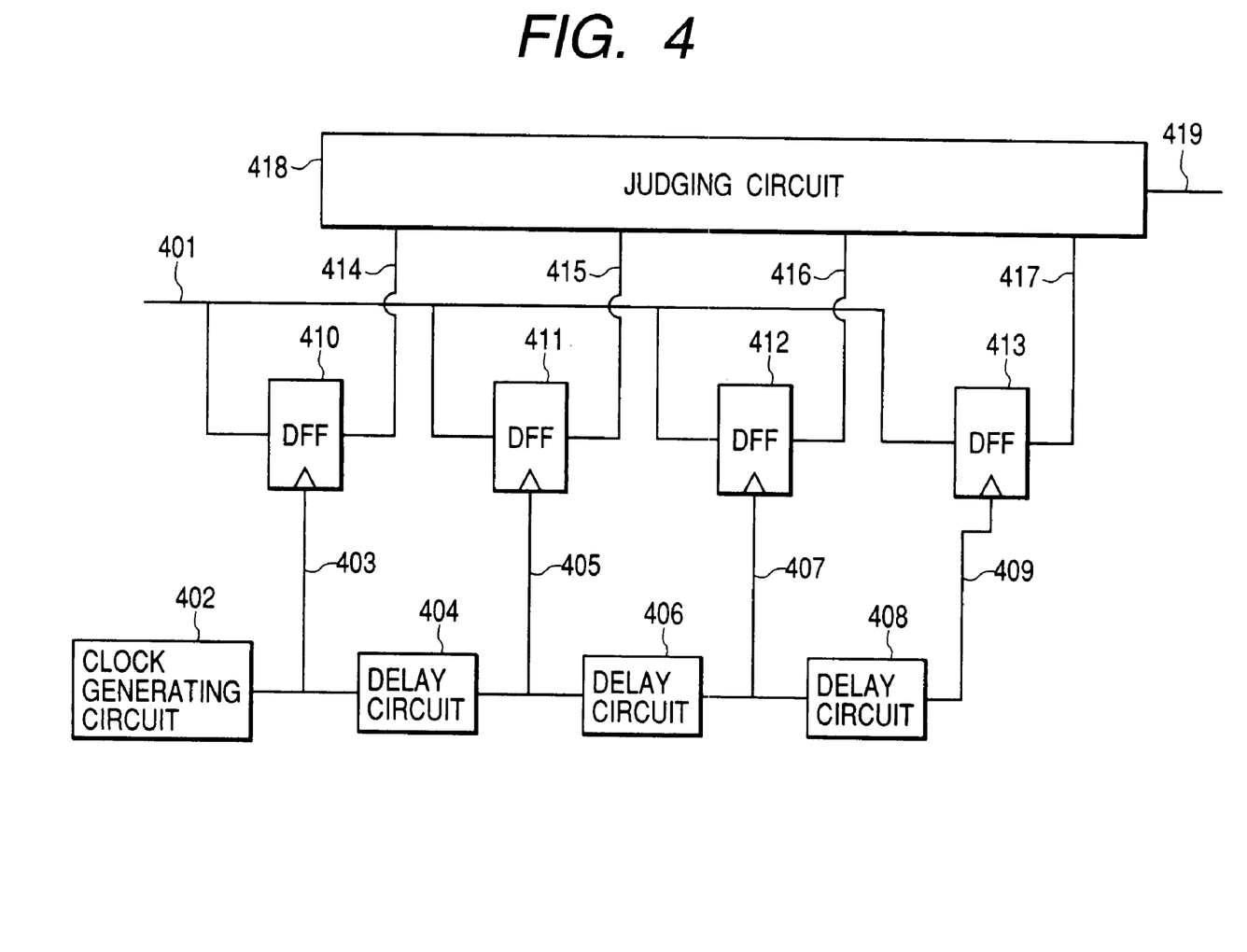
FIG. 4 is a functional block diagram showing a data receiving system in accordance with a fourth embodiment of the present invention.

FIG. 4 is a functional block diagram showing a data receiving system in accordance with the fourth embodiment of the present invention. In FIG. 4, a received data signal 401 carries digital data which is generally used for communications purpose and for data transmission between LSI circuits. A clock generating circuit 402 generates a clock signal 403 whose frequency is substantially two times a frequency of a data transmission rate of the received data signal 401.

A first delay circuits 404 delays the clock signal 403 by a predetermined time and generates a first delayed clock signal 405. A second delay circuits 406 delays the first delayed clock signal 405 by a predetermined time and generates a second delayed clock signal 407. A third delay circuits 408 delays the second delayed clock signal 407 by a predetermined time and generates a third delayed clock signal 409.

A first DFF circuit 210 fetches the received data signal 401 in response to a leading edge of the clock signal 403 and generates a first sampling value 414. A second DFF circuit 411 fetches the received data signal 401 in response to a leading edge of the first delayed clock signal 405 and generates a second sampling value 415. A third DFF circuit 412 fetches the received data signal 401 in response to a leading edge of the second delayed clock signal 407 and generates a third sampling value 416. A fourth DFF circuit 413 fetches the received data signal 401 in response to a leading edge of the third delayed clock signal 409 and generates a fourth sampling value 417.

A judging circuit 418 receives the first to fourth sampling values 414 to 417 and judges a received data value based on these sampling values.

Figure 8A:
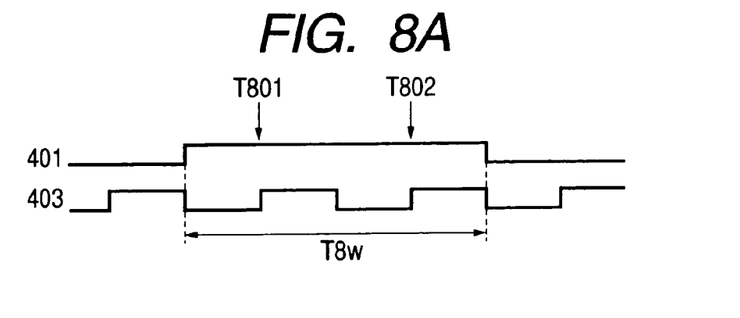
FIGS. 8A to 8C are timing charts showing the relationship of signals relating to the data receiving system in accordance with the fourth embodiment of the present invention.
Figure 8B:
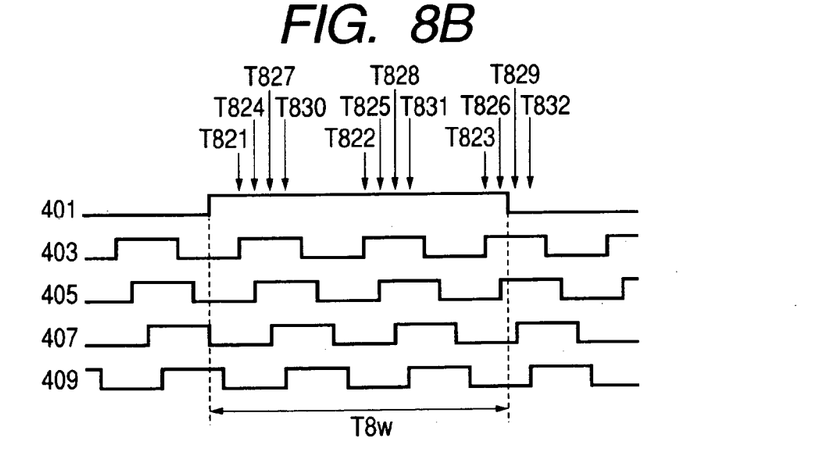
Figure 8C:
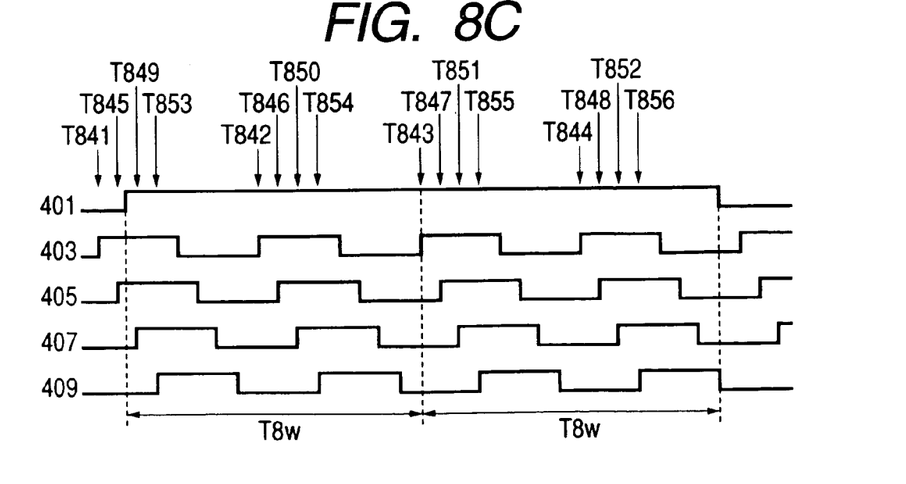

FIGS. 8A, 8B and 8C are timing charts showing the relationship among the received data signal 401, the clock signal 403, and delayed clock signals 405, 407, and 409. Times T801, T802, T821, T822, T823, T841, T842, T843, and T844 show leading edge positions of the clock signal 403. Times T824, T825, T826, T845, T846, T847 and T848 show leading edge positions of the delayed clock signal 405. Times T827, T828, T829, T849, T850, T851 and T852 show leading edge positions of the delayed clock signal 407. Times T830, T831, T832, T853, T854, T855 and T856 show leading edge positions of the delayed clock signal 409. In other words, these positions represent sampling times for the received data signal 401. T8w represents a time width of one data.

In a case shown FIG. 8A, the sampling times responsive to the clock signal 403 are sufficiently spaced from the edges of the received data signal 401. A time duration having the data value=1 is equal to the length of one data. In a case shown FIG. 8B, some of the sampling times responsive to the clock signal 403 is located near the edges of the received data signal 401. The frequency of the clock signal 403 is slightly higher than two times a frequency of the data transmission rate of the received data signal 401. A time duration having the data value=1 is equal to the length of one data. In a case shown FIG. 8C, some of the sampling times responsive to the clock signal 403 is located near the edges of the received data signal 401. The frequency of the clock signal 403 is slightly lower than two times the frequency of the data transmission rate of the received data signal 401. A time duration having the data value=1 is twice the length of one data.

The above-described data receiving system, serving as the fourth embodiment of the present invention, operates in the following manner. In the timing chart of FIG. 8A, there are two sampling points of T801 and T802 during a time interval equivalent to one data length of the received data signal 401 (corresponding to data value=1). In this case, the judging circuit 418 makes a judgement that the received data value is 1 as both of the sampling values are 1. However, in the timing chart of FIG. 8B, there are three sampling points of T821, T822, and T823 during a time interval of the received data signal 401 corresponding to data value=1. In the timing chart of FIG. 8C, there are three sampling points of T842, T843, and T844 during a time interval of the received data signal 401 corresponding to data value=1. When there are three sampling points, obtaining only the sampling point information is insufficient to correctly judge whether the received data is one data or two.

Hence, the data receiving system of the fourth embodiment successively samples the received data signal 401 in response to the leading edges of all of the delayed clock signal 405 which is delayed with respect to the clock signal 403, the delayed clock signal 407 which is delayed with respect to the delayed clock signal 405, and the delayed clock signal 409 which is delayed with respect to the delayed clock signal 407. According to this successive sampling operation, in the case shown in FIG. 8B, three sampling points exist for the delayed clock signal 405 while two sampling points exist for each of the delayed clock signals 407 and 409. In the case shown in FIG. 8C, three sampling points exist for the delayed clock signal 405 while four sampling points exist for each of the delayed clock signals 407 an 409. When there are an even number of sampling points, this value is utilized to judge the number of received data. More specifically, the judging circuit 418 judges that the received data is one data in the case of FIG. 8B and is two data in the case of FIG. 8C.

In general, when the sampling value of 1 (or 0) appears N times continuously in the sampling operation of the received signal 401 based on the clock signal 403 (where N is an even number), it is judged that the data of 1 (or 0) is continuously received (N/2) times. When N is an odd number, an even sampling number is extracted from the sampling numbers corresponding to the delayed clock signals of the clock signal 403. When the extracted one is expressed by (N−1), it is judged that the data of 1(or 0) is continuously received ((N−1)/2) times. When the extracted one is (N+1), it is judged that the data of 1(or 0) is continuously received ((N+1)/2) times.

Although the sampling operation is performed based on the leading edge, the fourth embodiment can be modified so as to perform the sampling operation based on a trailing edge. Furthermore, the above-described fourth embodiment judges the received data value based on the sampling result of the received data signal 401 responsive to the clock signal 403. And, only when the judgement is failed, the sampling result of the received data responsive to the delayed clock is used to judge the received data value. Alternatively, it is possible to judge the received data value based on the sampling result of the received data responsive to the delayed clock signal 407 and rely on other sampling result only when the judgement is failed. Furthermore, the total step number of the delay circuits can be flexibly changed.

As described above, the fourth embodiment of the present invention provides the data receiving system which generates the clock whose frequency is approximately two times the frequency of the data transmission rate, samples the received data in response to the leading edge of each of the clock and its delayed clock, and judges the received data value based on the sampling result of the received data responsive to the delayed clock when the received data value cannot be judged based on the sampling result of the received data responsive to the clock. Therefore, even when the received data is unreadable due to the jitter of clock, the fourth embodiment of the present invention makes it possible to correctly judge the received data value based on the result of judgement relying on the delayed clock.

What is claimed is:

1. A data receiving system comprising:
  a clock generating circuit for generating a clock whose frequency is synchronous with a frequency of a data transmission rate of a received data;
  a delay circuit for delaying said received data to generate a delayed data;
  a first sampling circuit for sampling said received data in response to at least one of leading and trailing edges of said clock and outputting a received data sampling value;
  a second sampling circuit for sampling said delayed data in response to at least one of leading and trailing edges of said clock and outputting a delayed data sampling value; and
  received data judging means for judging a received data value based on said received data sampling value and said delayed data sampling value,
  wherein said received data judging means comprises:
  first judging means for judging the received data value primarily based on either one of said received data sampling value and said delayed data sampling value; and
  second judging means for judging the received data value secondarily based on the other of said received data sampling value and said delayed data sampling value when said first judging means fails to judge the received data value, and
  said received data judging means judges the received data value with reference to same sampling values continuously appearing N times in a sampling operation, N being a natural number.

2. The data receiving system in accordance with claim 1, wherein
  said clock generating circuit is for generating a clock whose frequency is substantially identical with the frequency of the data transmission rate of said received data;
  said first sampling circuit is for sampling said received data in response to both of leading and trailing edges of said clock and outputting received data sampling values; and
  said second sampling circuit is for sampling said delayed data in response to both of leading and trailing edges of said clock and outputting delayed data sampling value.

3. The data receiving system in accordance with claim 1, wherein
  said clock generating circuit is for generating a clock whose frequency is approximately two times the frequency of the data transmission rate of said received data;
  said first sampling circuit is for sampling said received data in response to one of leading and trailing edges of said clock and outputting the received data sampling value; and
  said second sampling circuit is for sampling said delayed data in response to one of leading and trailing edges of said clock and outputting delayed data sampling value.

4. The data receiving system in accordance with claim 1, wherein said N is an even number, and it is judged that said same sampling value is continuously received (N/2) times.

5. The data receiving system in accordance with claim 1, wherein said N is an odd number, and it is judged that said sampling value is continuously received ((N−1)/2) times or ((N+1)/2) times.

6. A data receiving system comprising:
  a clock generating circuit for generating a clock whose frequency is synchronous with a frequency of a data transmission rate of a received data;
  a delay circuit for delaying said clock to generate a delayed clock;
  a first sampling circuit for sampling said received data in response to at least one of leading and trailing edges of said clock and outputting a received data sampling value;
  a second sampling circuit for sampling said received data in response to at least one of leading and trailing edges of said delayed clock and outputting a delayed data sampling value; and
  received data judging means for judging a received data value based on said received data sampling value and said delayed data sampling value,
  wherein said received data judging means comprises;
  fist judging means for judging the received data value primarily based on either one of said received data sampling value and said delayed data sampling value; and
  second judging means for judging the received data value secondarily based on the other of said received data sampling value and said delayed data sampling value when said first judging means fails to judge the received data value, and
  said received data judging means judges the received data value with reference to same sampling values continuously appearing N times in a sampling operation, where N is a natural number.

7. The data receiving system in accordance with claim 6, wherein
  said clock generating circuit is for generating a clock whose frequency is substantially identical with the frequency of the data transmission rate of said received data;
  said first sampling circuit is for sampling said received data in response to both of leading and tailing edges of said clock and outputting received data sampling values; and
  said second sampling circuit is for sampling said received data in response to both of leading and trailing edges of said delayed clock and outputting delayed data sampling value.

8. The data receiving system in accordance with claim 6, wherein
said clock generating circuit is for generating a clock whose frequency is approximately two times the frequency of the data transmission rate of said received data;
said first sampling circuit is for sampling said received data in response to one of leading and trailing edges of said clock and outputting the received data sampling value; and
said second sampling circuit is for sampling said received data in response to one of leading and trailing edges of said delayed clock and outputting delayed data sampling value.

9. The data receiving system in accordance with claim 6, wherein said N is an even number, and it is judged that said same sampling value is continuously received (N/2) times.

10. The data receiving system in accordance with claim 6, wherein said N is an odd number, and it is judged that said sampling value is continuously received ((N−1)/2) times or ((N+1)/2) times.

* * * * *